United States Patent
Michaelis et al.

(10) Patent No.: US 8,238,335 B2
(45) Date of Patent: Aug. 7, 2012

(54) MULTI-ROUTE TRANSMISSION OF PACKETS WITHIN A NETWORK

(75) Inventors: Paul Roller Michaelis, Louisville, CO (US); David Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 847 days.

(21) Appl. No.: 12/371,065

(22) Filed: Feb. 13, 2009

(65) Prior Publication Data
US 2010/0208728 A1    Aug. 19, 2010

(51) Int. Cl.
*H04L 12/28* (2006.01)

(52) U.S. Cl. ........ 370/389; 370/392; 370/400; 709/238; 709/239

(58) Field of Classification Search .................. None
See application file for complete search history.

(56) References Cited

U.S. PATENT DOCUMENTS

| | | |
|---|---|---|
| 5,035,252 A | 7/1991 | Mondre |
| 5,537,447 A | 7/1996 | Urbansky |
| 5,619,514 A | 4/1997 | Smith |
| 5,745,425 A | 4/1998 | Anderson et al. |
| 5,859,882 A | 1/1999 | Urbansky |
| 5,920,507 A | 7/1999 | Takeuchi et al. |
| 6,141,788 A | 10/2000 | Rosenberg et al. |
| 6,170,075 B1 | 1/2001 | Schuster et al. |
| 6,243,836 B1 | 6/2001 | Whalen |
| 6,260,071 B1 | 7/2001 | Armistead et al. |
| 6,381,645 B1 | 4/2002 | Sassin |
| 6,434,590 B1 | 8/2002 | Blelloch et al. |
| 6,434,606 B1 | 8/2002 | Borella et al. |
| 6,452,950 B1 | 9/2002 | Ohlsson et al. |
| 6,650,637 B1 | 11/2003 | Bansal et al. |
| 6,690,675 B1 | 2/2004 | Kung et al. |
| 6,721,335 B1 * | 4/2004 | Gregg ........................... 370/473 |
| 6,763,226 B1 | 7/2004 | McZeal, Jr. |
| 6,769,027 B1 | 7/2004 | Gebhardt et al. |
| 6,823,047 B1 | 11/2004 | Cruickshank |
| 6,845,129 B2 | 1/2005 | Golin |
| 6,862,298 B1 | 3/2005 | Smith et al. |

(Continued)

FOREIGN PATENT DOCUMENTS

DE         10211740         10/2003

(Continued)

OTHER PUBLICATIONS

U.S. Appl. No. 11/329,933, Karacali et al.

(Continued)

*Primary Examiner* — Chirag Shah
*Assistant Examiner* — Srinivasa Reddivalam
(74) *Attorney, Agent, or Firm* — Sheridan Ross P.C.

(57) ABSTRACT

Two or more packets are generated from the same data stream (e.g., an audio signal) and are sent on a network. When the first of the two or more packets is received, a first optimal route for the first packet is determined, the first packet is sent on the first optimal route, and information about the first packet is stored in a packet list. When another packet is received, the process determines whether it is the second packet of the two or more packets by comparing at least one field in the second packet to the stored information about the first packet in the packet list. If there is a match, a second optimal route for the second packet is determined, and the second packet is sent on the second optimal route.

21 Claims, 4 Drawing Sheets

U.S. PATENT DOCUMENTS

| | | |
|---|---|---|
| 6,879,582 B1 | 4/2005 | Dhara et al. |
| 6,914,899 B2 | 7/2005 | Siegrist et al. |
| 6,914,964 B1 | 7/2005 | Levine |
| 6,977,948 B1 | 12/2005 | Chennubhotla et al. |
| 6,988,126 B2 | 1/2006 | Wilcock et al. |
| 7,203,193 B2 | 4/2007 | Hoof |
| 7,215,959 B2 | 5/2007 | Creamer et al. |
| 7,293,176 B2 | 11/2007 | Otway et al. |
| 7,352,766 B2 | 4/2008 | Van Asten et al. |
| 7,359,979 B2 | 4/2008 | Gentle et al. |
| 7,385,985 B2 | 6/2008 | Narsinh et al. |
| 7,386,115 B2 | 6/2008 | Peters |
| 7,418,002 B2 | 8/2008 | Robotham et al. |
| 7,477,653 B2 | 1/2009 | Smith et al. |
| 7,496,750 B2 | 2/2009 | Kumar et al. |
| 7,558,529 B2 | 7/2009 | Seshadri et al. |
| 7,583,660 B2 | 9/2009 | Croak et al. |
| 7,626,994 B2 | 12/2009 | Bennett |
| 7,627,097 B2 | 12/2009 | Kawabata et al. |
| 7,643,470 B2 | 1/2010 | Herledan et al. |
| 7,702,947 B2 | 4/2010 | Peddada |
| 7,782,839 B2 | 8/2010 | Otsuka et al. |
| 7,830,860 B2 | 11/2010 | Farris et al. |
| 7,864,814 B2 | 1/2011 | Johansson et al. |
| 7,881,284 B2 | 2/2011 | Lin et al. |
| 2001/0028634 A1 | 10/2001 | Huang et al. |
| 2003/0163328 A1 | 8/2003 | Rambo et al. |
| 2004/0057445 A1 | 3/2004 | LeBlanc |
| 2004/0076190 A1 | 4/2004 | Goel et al. |
| 2004/0120309 A1 | 6/2004 | Kurittu et al. |
| 2005/0094618 A1 | 5/2005 | Colban et al. |
| 2005/0249146 A1 | 11/2005 | Pinault et al. |
| 2006/0007915 A1 | 1/2006 | Frame |
| 2006/0062371 A1 | 3/2006 | Vanderheiden et al. |
| 2006/0083199 A1 | 4/2006 | Yang |
| 2006/0140221 A1 | 6/2006 | Yamada et al. |
| 2006/0203805 A1 | 9/2006 | Karacali-Akyamac et al. |
| 2006/0251051 A1 | 11/2006 | Bhatt et al. |
| 2006/0256772 A1* | 11/2006 | Yarlagadda ............... 370/352 |
| 2006/0277051 A1 | 12/2006 | Barriac et al. |
| 2007/0026852 A1 | 2/2007 | Logan et al. |
| 2007/0110034 A1 | 5/2007 | Bennett |
| 2007/0147399 A1 | 6/2007 | Deng et al. |
| 2007/0167156 A1 | 7/2007 | Hundal |
| 2007/0183323 A1 | 8/2007 | Hannu et al. |
| 2007/0223467 A1 | 9/2007 | Makiuchi et al. |
| 2007/0280428 A1 | 12/2007 | McClelland |
| 2007/0291733 A1 | 12/2007 | Doran et al. |
| 2008/0002689 A1 | 1/2008 | Vera |
| 2008/0013528 A1 | 1/2008 | Miller et al. |
| 2008/0165708 A1 | 7/2008 | Moore et al. |
| 2008/0187108 A1 | 8/2008 | Engelke et al. |
| 2008/0205377 A1 | 8/2008 | Chao et al. |
| 2008/0232353 A1 | 9/2008 | Vafin et al. |
| 2008/0232442 A1 | 9/2008 | Rodbro et al. |
| 2008/0240004 A1 | 10/2008 | Shaffer et al. |
| 2008/0298336 A1 | 12/2008 | Gollamudi |
| 2008/0298349 A1 | 12/2008 | Beightol et al. |
| 2008/0310398 A1 | 12/2008 | Jain et al. |
| 2009/0074012 A1 | 3/2009 | Shaffer et al. |
| 2009/0213837 A1 | 8/2009 | Ku et al. |
| 2009/0234940 A1 | 9/2009 | Pal et al. |
| 2009/0235329 A1 | 9/2009 | Chavez et al. |
| 2010/0165857 A1 | 7/2010 | Meylan et al. |
| 2010/0188967 A1* | 7/2010 | Michaelis et al. ............ 370/216 |
| 2010/0189097 A1 | 7/2010 | Brinkmann et al. |
| 2010/0239077 A1 | 9/2010 | Michaelis et al. |
| 2010/0265834 A1 | 10/2010 | Michaelis et al. |
| 2010/0271944 A1 | 10/2010 | Michaelis et al. |
| 2010/0322391 A1 | 12/2010 | Michaelis et al. |

FOREIGN PATENT DOCUMENTS

| | | |
|---|---|---|
| DE | 102006027708 | 2/2008 |
| EP | 0152251 | 8/1985 |
| EP | 1471708 | 10/2004 |
| EP | 1515506 | 3/2005 |
| EP | 1681844 | 7/2006 |
| EP | 1729490 | 12/2006 |
| EP | 2014020 | 1/2009 |
| EP | 2056640 | 5/2009 |
| WO | WO 98/44693 | 10/1998 |
| WO | WO 99/41876 | 8/1999 |
| WO | WO 2007/124577 | 11/2007 |
| WO | WO 2007/131296 | 11/2007 |

OTHER PUBLICATIONS

U.S. Appl. No. 11/342,193, Diethorn et al.

Azuri, Calvin, TMCnet Contributing Editor, Edgewater Networks, Inc. Announces Extension of VoIP Failover Capabilities at the Enterprise Edge, http://74.125.95.104/search?q=cache:JgCKutpPN7gJ:voipservices.tmcnet.com/feature/article, TMCnet.com, Nov. 16, 2007.

U.S. Appl. No. 12/548,271, filed Aug. 26, 2009, Michaelis et al.

Background for the above captioned application (previously provided).

Wikipedia; Jitter—From Wikipedia, the free encyclopedia; printed from http://en.wikipedia.org/wiki/Jitter on Mar. 10, 2009; 6 pages.

Counterpath Corporation; "Network Convergence Gateway (NCG)", Internet Article printed on Nov. 25, 2008 from http://www.counterpath.com/network-convergence-gateway-ncg.html; 2 pages.

Gurock, et al., "Selecting the Right License Strategy for your Software", printed on Jul. 25, 2009, from the Internet at http://blog.gurock.com/articles/selecting-the-right-license-strategy-for-your-software, 6 pages.

Stevenson; "F/MC Watch: MobileSTICK a Silver Lining for Mobile Operators"; Internet Article printed on Feb. 6, 2009 from http://www.voipplanet.com/solutions/article.php/3670276; 6 pages. dated Apr. 7, 2007.

Webopedia; What is jitter buffer?—A Word Definition for the Webopedia Computer Dictionary; printed from http://www.webopedia.com|TERM/J/jitter_buffer.html on Mar. 10, 2009; 6 pages.

Wikipedia; "Network switching subsystem"; Internet Article printed on Feb. 6, 2009 from http://en.wikipedia.org/wiki/Home_Location_Register; 10 pages.

Wikipedia; "Subscriber Identity Module"; Internet Article printed on Feb. 6, 2009 from http://en.wikipedia.org/wiki/Subscriber_Identity_Module; 8 pages.

Wikipedia "H.323", http://en.wikipedia.org/w/index.php?title=H.323&printable=yes, Dec. 18, 2008, 14 pages.

Wikipedia "RTP Control Protocol"; http://en.wikipedia.org/w/index.php?title=RTP_Control_Protocol&pr . . . Jan. 9, 2009, 3 pages.

Wikipedia "Voice over Internet Protocol"; http://en.wikipedia.org/wiki/Voice_over_Internet_Protocol Jan. 23, 2009, 15 pages.

Wikipedia "H.245"; http://en.wikipedia.org/wiki/H.245 Nov. 9, 2009, 1 page.

Hahn N: "Dialog Via Internet Call Center" Nachrichtentechnik Elektronik, Veb Verlag Technik. Berlin, DE, vol. 48, No. 4, Jul. 1, 1998 pp. 17-19, XP000784128, ISSN: 0323-4657.

"Indepth: Jitter", VoIP Troubleshooter website, available at http://www.voiptroubleshooter.com/indepth/jittersources.html, accessed on Oct. 22, 2009, pp. 1-8.

* cited by examiner

MULTI-ROUTE TRANSMISSION OF PACKETS WITHIN A NETWORK

TECHNICAL FIELD

The system and method relates to redundant communications and in particular to routing of redundant packets within a network.

BACKGROUND

Currently, there are a variety of systems that send redundant data streams over the same network. This way, if a path within the network fails, the redundant data stream will protect against loss of packets within the data stream.

Other systems are adaptively redundant. For example, U.S. Patent Application Publication No. 2007/2056772 describes a system that can send duplicate message packets over different networks based on whether one network connection is preferable over another network connection. If another connection is deemed to be the optimal path, the sending of duplicate packets over the prior network path is ceased.

U.S. Patent Application Publication No. 2007/0183323 discloses a system that determines when a need for redundancy is necessary. When a threshold is met, the system adaptively sends redundant packets. The threshold can be based on the number of packets, lost packets, buffer sizes, etc.

The problem with these and other approaches is that, when time sensitive data such as live audio and video streams are being routed across a network, the path chosen by a router may not always be optimal. This can result in excessive delay for time sensitive data. In addition, if the same router receives a duplicate packet, the router will likely send the duplicate packet on the same route. This is because routers do not look to see if a packet is a duplicate packet before routing a packet. If both packets end up being sent on the same route, the delay for both packets will likely be similar. If the chosen route is not optimal, then the delay for both packets may become excessive, resulting in the packets not being delivered in a timely manner to the destination.

SUMMARY

The system and method are directed to solving these and other problems and disadvantages of the prior art. In the defined system and method, a first packet is received. The first packet is one of two or more packets that are generated from the same data stream (e.g., an audio signal) and are sent on a network. If the packet is the first of the two or more packets received, a first optimal route for the first packet is determined, the first packet is sent on the first optimal route, and information about the first packet is stored in a packet list.

When another one of the two or more packets is received, the process determines that the packet is a second packet by comparing at least one field in the second packet to the stored information about the first packet in the packet list. If there is a match, a second optimal route for the second packet is determined. The second packet is sent on the second optimal route. When all of the two or more packets have been received, the information about the first packet in the packet list is deleted.

BRIEF DESCRIPTION OF THE DRAWING

These and other features and advantages of the system and method will become more apparent from considering the following description of an illustrative embodiment of the system and method together with the drawing, in which.

DETAILED DESCRIPTION

Figure 1:
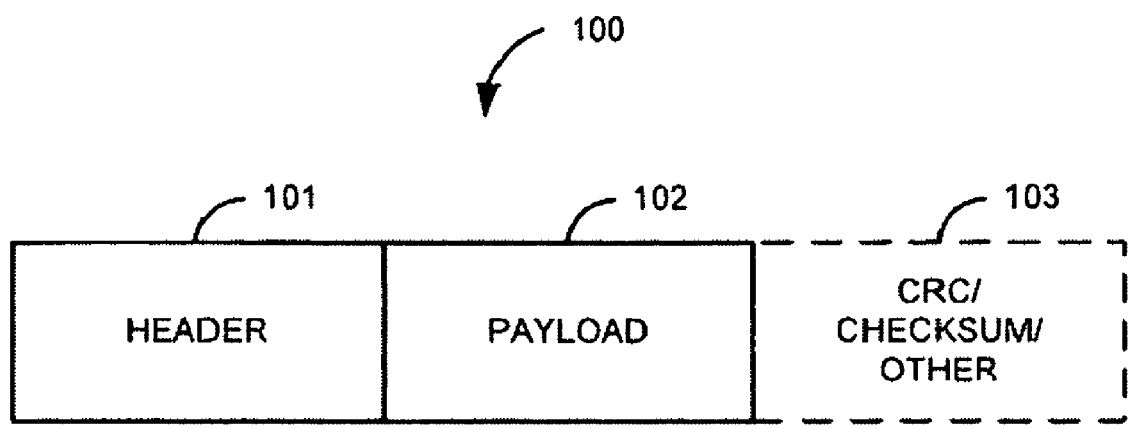
FIG. 1 is a block diagram of a typical packet that is used in sending a data stream.

FIG. 1 is a block diagram of a typical packet 100 that is used in sending a data stream. The packet 100 comprises a plurality of fields. Fields in the packet 100 can include, but are not limited to, a header 101, a payload 102, and a Cyclic Redundancy Check (CRC)/Checksum/other field 103. The header 101 is typically used in routing a packet 100 across a network. The header can contain a variety of fields which can be based on a variety of protocols. For example, the header 101 could be based on protocols such as Transmission Communication Protocol (TCP), Internet Protocol (IP), User Datagram Protocol (UDP), High Level Data Link Control (HDLC), Synchronous Data Link Control (SDLC), asynchronous protocols, Session Initiation Protocol (SIP), and the like.

The payload 102 is generated from a segment of a data stream. For example, the payload 102 can be generated from a sample of an audio signal or video signal. The samples of the data signal are encoded as segments in the payload 102 and routed over a network by adding the header 101 and other fields such as the CRC/Checksum/Other field 103. For example, an encoder may sample an audio stream every 20 milliseconds (ms.) and send out a SIP packet for each sample over the Internet. The CRC/Checksum/Other field 103 is a field that is typically placed after the payload 102 in some protocols. Or, the CRC/Checksum/Other field may be included within the header 101.

Figure 2:
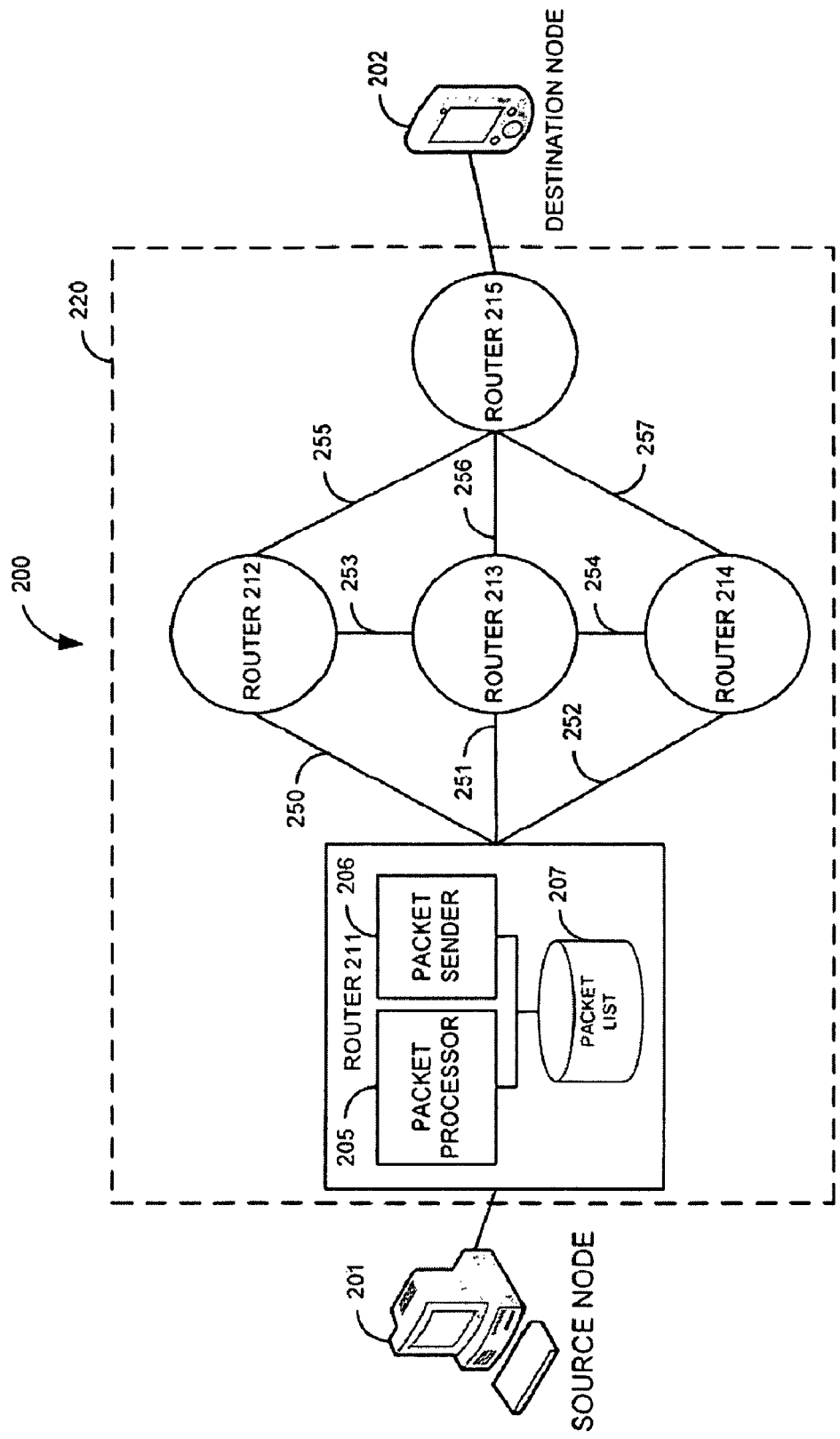
FIG. 2 is a block diagram of an illustrative system for routing packets within a network.

FIG. 2 is a block diagram of an illustrative system 200 for routing packets 100 within a network 220. The illustrative system 200 comprises a source node 201, the network 220, and a destination node 202. The source node 201 can be any device capable of sending/generating at least two packets 100 that are generated from the same segment of a data signal, including but not limited to a Personal Computer (PC), a router, a server, a telephone, a video device, and the like. The destination node 202 can be any device capable of receiving packets 100 such as a PC, a telephone, a video device, a router, a server, and the like.

The network 220 comprises routers 211-215. Routers 211-215 can be any device capable of routing packets 100 on the network 220. Router 211 comprises a packet processor 205, a packet sender 206, and a packet list 207. Routers 212-215 may also comprise the same elements 205-207 as router 211 or may be other routers within the network 220. In a preferred embodiment, all the routers 211-215 would be similar to router 211. The connections between routers 211-215 are called routes 250-257. The packet list 207 is any device or circuit capable of storing information such as a hard disk, a Random Access Memory (RAM), a data base, and the like.

Typically, the source node 201 generates/forwards a first packet and a second packet. The first and the second packet are generated from the same segment of the data signal. The data signal can be an audio stream, a video stream, a control signal, and the like that are sampled and sent as packets 100. The first packet is the first packet received at a router 211-215 and the second packet is the second packet received at one of the routers 211-215. In other environments, the first packet could come from one node (not shown) and the second packet could come from a second node (not shown). In still other environments, the source node 201 can generate/forward the first packet, the second packet, and one or more additional packets that are generated from the same segment of the data signal. The first packet and the second packet typically have a header 101 and a payload 102 and optionally a CRC/Checksum/Other field 103.

The first packet and the second packet can be identical, but do not have to be. For example, the two packets may contain the same payload 102, but the first packet may be generated using one protocol and the second packet may be generated using a second protocol. Another example could be where the same protocol is used, but the payload of the first packet is encoded using one encoding technique and the second packet is encoded using a second encoding technique. Still another example could be where one or more fields in the header 102 and/or the CRC/Checksum/Other field 103 are different.

The packet processor 205 in router 211 receives the first packet. The packet processor 205 determines that a second packet that was generated from the same segment of the data signal was not received previously by comparing information in the packet list 207 to at least one field in the first packet. Comparing the information in the packet list 207 could be comparing an empty packet list 207. If the packet list 207 is empty, the packet processor 205 will determine that a second packet was not received previously. In some cases, the packet list 207 could be empty. Typically, the packet list 207 will contain information about any first packets that have been received without receiving a second packet generated from the same segment of the data signal. If the packet list 207 does not contain information about a previously received first packet that was generated from the same segment of the data signal, the packet sender 206 in router 211: 1) determines a first optimal route for the first packet, 2) sends the first packet on the first optimal route, and 3) stores information about the first packet in the packet list 207.

The packet processor 205 in router 211 receives the second packet. The packet processor 205 determines that the second payload was generated from the same segment of the data signal by comparing the stored information about the first packet in the packet list 207 to at least one field in the second packet. The packet processor 205 can determine that the second payload was generated from the same segment of the data signal in various ways. For example, the packet processor 205 can compare at least one field from the stored information about the first packet to at least one field in the second packet. In some cases multiple fields can be compared. Some of the fields that can be compared are a checksum 103, a cyclic-redundancy check 103, a timestamp, a duration field, a sequence number, the header 101, the payload 102, an urgency field, a packet type, a quality of service field, a packet length, a source node number, a destination node number, and the like. Another way to determine that the second payload was generated from the same segment of the data signal is determine that the first packet and the second packet are identical. A way to determine that the first and the second packets are identical is to compare a stored packet length field and a CRC field 103 from the first packet to a packet length field and a CRC field 103 from the second packet. If the fields are the same, then the router 211 would consider the packets identical.

In response to determining that the second payload was generated from the same segment of the data signal, the packet sender 206 in router 211: 1) determines a second optimal route for the second packet, and 2) sends the second packet on the second optimal route. In a preferred embodiment, the packet sender 206 also deletes the information about the first packet in the packet list 207 based on determining that the second payload was generated from the same segment of the data signal. The first packet and the second packet are then routed through the network 220 and routers 212-215 (assuming that routers 212-215 contain the packet processor 205, the packet sender 206, and the packet list 207) in like manner.

If the second packet is not received within a time period or at all, the packet processor 205 can delete the information in the packet list 207 about the first packet. This process could be a polled process, a software thread, and the like. The deletion of the information in the packet list 207 for the first packet can alternatively be based on a size of a jitter buffer, a size of a jitter buffer in a destination node 202, a size of a jitter buffer in a source node 201, a size of a list in a router 211-215, a size of a circular list in a router 211-215, an acceptable delay based on the data signal, a fixed time period, and the like.

As an example of how this process works, consider the following example. Assume for simplicity that the packet lists 207 in the routers 211-215 are empty to start with. The source node 201 generates/forwards two identical packets that are generated from the same segment of the data signal to router 211. The packet processor 205 in router 211 receives a first packet of the identical packets. The packet processor 205 determines that a second packet that corresponds to the first packet was not received previously by comparing the information in the packet list 207 (the packet list 207 is empty) to the information in the first packet. Since a second packet has not been received previously (i.e. the packet list 207 is empty), the packet sender 206 determines a first optimal route (route 250) for the first received packet. The packet sender 206 sends the first received packet on route 250. The packet sender 206 stores information about the first received packet in the packet list 207.

The packet processor 205 in router 211 receives the second packet of the identical packets. The packet processor 205 determines that the second payload in the second packet was generated from the same segment of the data signal by determining that the second packet is identical to the first packet. This is done by comparing the stored information about the first packet in the packet list 207 (the whole packet) to the second packet. The packet sender 206 determines a second optimal route (route 251) for the second received packet. The packet sender 206 sends the second received packet on route 251. The packet sender 206 deletes the information in the packet list 207 about the first received packet.

The packet processor 205 in router 212 receives a first packet that was sent from router 211. The packet processor 205 determines that a second packet that was generated from the same segment of the data signal as the first packet was not received previously by comparing information in the packet list 207 (which is empty) to at least one field in the first packet. The packet sender 206 in router 212 determines a first optimal route (route 253) for the first received packet. The packet sender 206 sends the first received packet on the first optimal route 253. The packet sender 206 stores information about the first received packet in the packet list 207 in router 212. The packet processor 205 in router 212 never receives a second packet. The packet sender 206, based on a period of time, deletes the information about the first received packet from the packet list 207.

Router 213 receives a first packet that was sent from router 211. The packet processor 205 in router 213 determines that a second packet that was generated from the same segment of the data signal as the first packet has not been previously received. The packet sender 206 determines a first optimal route (route 256) for the received first packet. The packet sender 206 sends the received first packet on route 256. The packet sender 206 stores information about the first received packet in the packet list 207 in router 213. Router 213 receives a second packet from router 212. The packet processor 205 in router 213 determines that the second payload was generated from the same segment of the data signal by determining that the first and second packets are identical. The packet sender 206 determines a second optimal route (route 254) for the second packet. The packet sender 206 sends the second packet on route 254. The packet sender 206 deletes the information about the received first packet from the packet list 207.

Router 214 receives a first packet that was sent from router 213. The packet processor 205 in router 214 determines that a second packet that was generated from the same segment of the data signal as the first packet was not previously received because the packet list 207 is empty. The packet sender 206 determines a first optimal route (route 257) for the first received packet. The packet sender 206 sends the first received packet on route 257. The packet sender 206 stores information about the first received packet in the packet list 207. The packet processor 205 never receives a second packet that corresponds to the first packet. The packet sender 206 deletes information about the first received packet from the packet list 207 based on a period of time.

Router 215 receives a first packet that was sent from router 213. Since router 215 is directly connected to the destination node 202, the packet processor 205 in router 215 does not need to determine that a second packet has been received previously (however, the packet processor 205 could use this process). The packet sender 206 sends the first received packet to the destination node 202. Router 215 receives a second packet from router 214. The packet processor 205 in router 215 does not need to determine that the second payload was generated from the same segment of the data signal because the destination node 202 is directly connected to router 215 (however, the packet processor 205 could use this process to delete the second packet). The packet sender 206 sends the second packet to the destination node 202.

Figure 3:
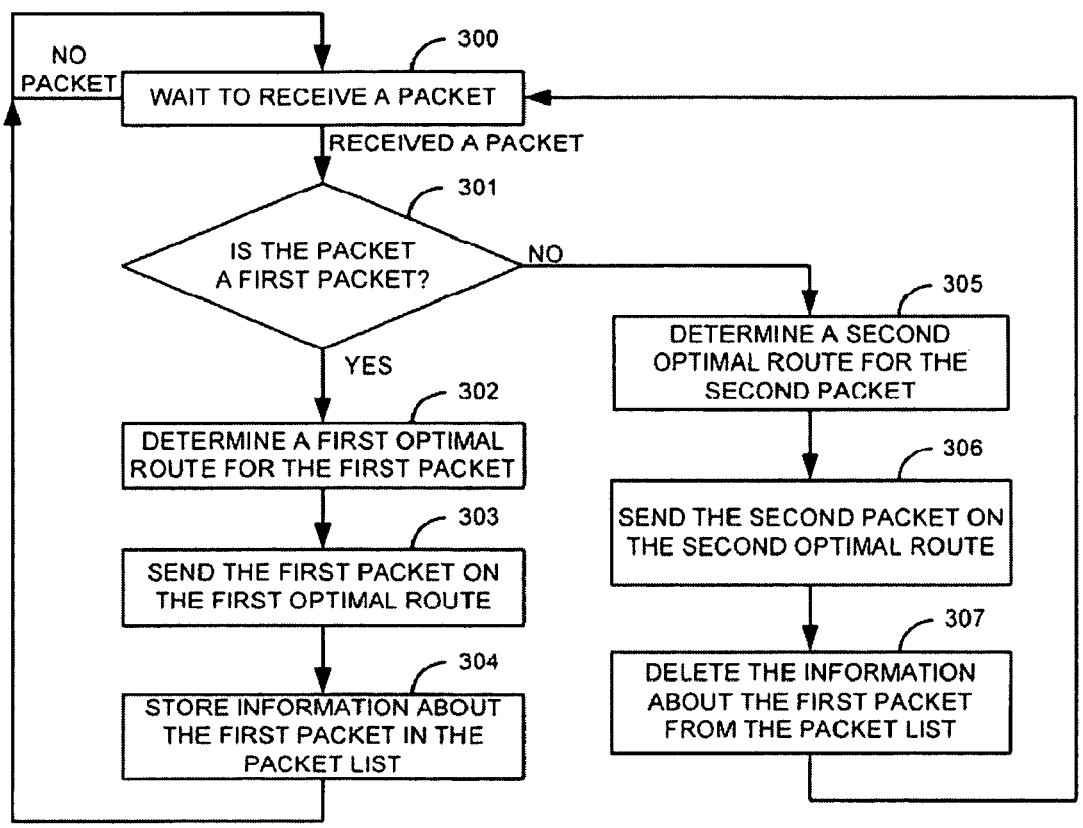
FIG. 3 is a flow diagram of a method for routing packets within a network.

FIG. 3 is a flow diagram of a method for routing packets within a network 220. Illustratively, the packet processor 205, the packet sender 206, and the packet list 207 are stored-program-controlled entities, such as a computer, which performs the methods of FIGS. 3-4 by executing a program stored in a storage medium, such as a memory or disk.

The process begins by waiting 300 to receive a packet. If no packet is received, the process continues to wait 300 to receive a packet. Once a packet is received, the process determines 301 if the received packet is a first packet. A first packet is the first received of two or more packets generated from the same segment of the data signal. Step 301 is accomplished by determining that a second packet that was generated from the same segment of the data signal was not received previously by comparing information in the packet list 207 to at least one field in the first packet. If the received packet is a first packet, the process determines 302 a first optimal route for the first packet. The first packet is sent 303 on the first optimal route. Information about the first packet is stored 304 in the packet list 207. The information that is stored can be the entire packet, a single field, multiple fields, or any other information necessary to identify the first packet.

If the process determines 301 that the second packet was generated from the same segment of the data signal by comparing the stored information about the first packet in the packet list 207 (stored previously in step 304) to at least one field in the second packet, the process determines 305 a second optimal route for the second packet. The second packet is sent 306 on the second optimal route. The information about the first packet (stored previously in step 304) is deleted 307 from the packet list 207. The process then waits 300 to receive a packet.

The process described in FIG. 3 can also be used to send more than two packets that are generated from the same segment of the data signal. For example, if there were three packets that are generated from the same segment of the data signal, then the process could determine a third optimal route for the third packet, send the third packet on the third optimal route and the like.

Figure 4:
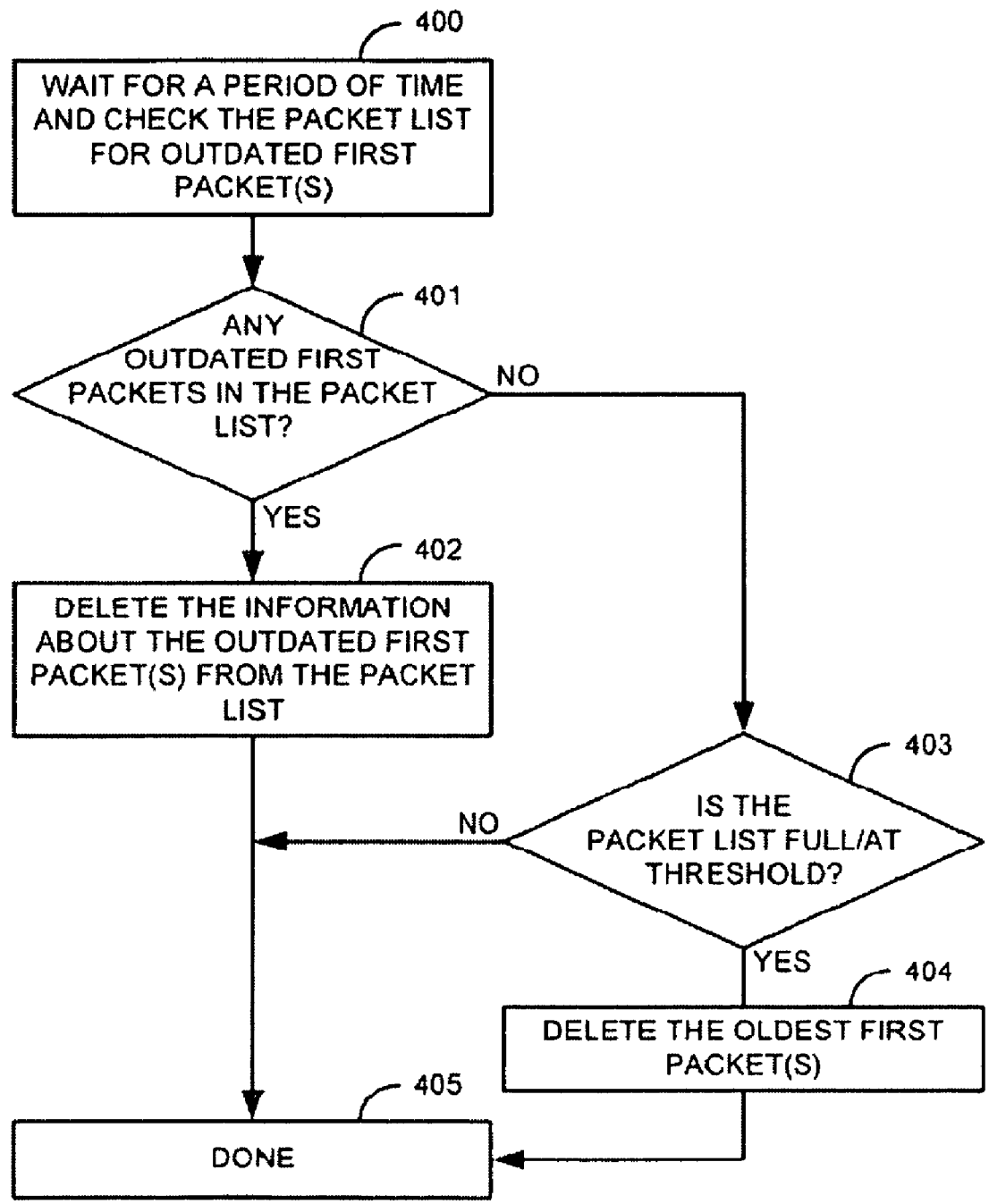
FIG. 4 is a flow diagram of a method for managing outdated first packets in a packet list.

FIG. 4 is a flow diagram of a method for managing outdated first packets in a packet list 207. The method of FIG. 4 is a method of periodically deleting information in the packet list 207 as the information about first received packets becomes outdated. The process waits 400 for a period of time and periodically checks the packet list 207 for outdated first packet(s). Waiting 400 for the period of time can be implemented in various ways such as a software thread, a polled process, when the packet list 207 hits a threshold or is full, and the like.

The process checks 401 to see if any outdated first packets are stored in the packet list 207. First packet(s) can become outdated in various ways such as not receiving the second packet within a period of time, a size of a jitter buffer in the router 211-215, a size of a jitter buffer in a destination node 202, a size of a jitter buffer in a source node 201, a size of a table in a router 211-215, a size of a circular queue in a router 211-215, an acceptable delay based on the data signal, a fixed time, if the packet list 207 is full, if the threshold in the packet list 207 is met, and the like. If there are outdated packets in the packet list 207 in step 401, the process deletes 402 the information about the outdated first packet(s) from the packet list 207 and the process is done 405. Otherwise, if there are not any outdated packets in the packet list 207 in step 401, the process determines 403 if the packet list 207 is full or at a threshold. The threshold could be where a percentage of the packet list 207 is full. If the packet list is not full or not at or above the threshold, the process is done 405. Otherwise, the process deletes 404 the oldest first packet(s) and is done 405.

Of course, various changes and modifications to the illustrative embodiment described above will be apparent to those skilled in the art. Some of the variations would include more than one redundant copy of a particular packet, source node packets being sent to multiple destinations each with multiple redundant copies, centralized conferencing or other telecommunications resources that act as a hub for multiple source and destination nodes, and the like. These changes and modifications can be made without departing from the spirit and the scope of the system and method and without diminishing its attendant advantages. It is therefore intended that such changes and modifications be covered by the following claims except insofar as limited by the prior art.

What is claimed is:

1. A system for routing packets comprising:
   a. a packet processor configured to receive a first packet, wherein the first packet comprises a plurality of fields, including a first payload, and wherein the first payload is generated from a segment of a data signal, determine that a second packet that was generated from the same segment of the data signal was not received previously by comparing information in a packet list to at least one field in the first packet, receive the second packet, wherein the second packet comprises a plurality of fields, including a second payload, and wherein the second payload is generated from the segment of the data signal, determine that the second payload was generated from the same segment of the data signal as the first packet by comparing information about the first packet stored in the packet list to at least one field in the second packet; and
b. a packet sender responsive to a determination that the second packet that was generated from the same segment of the data signal as the first packet was not received previously, by
  (1) storing information about the first packet in the packet list,
  (2) determining a first optimal route for the first packet, and
  (3) sending the first packet on the first optimal route; and
c. responsive to a determination that the second payload was generated from the same segment of the data signal as the first packet, by
  (1) determining a second optimal route for the second packet, and
  (2) sending the second packet on the second optimal route.

2. The system of claim 1, wherein the packet sender is further configured to delete the stored information about the first packet from the packet list responsive to determining that the second payload was generated from the same segment of the data signal as the first packet.

3. The system of claim 1, wherein the packet processor is further configured to delete the stored information about the first packet from the packet list based on least one item selected from the group comprising: not receiving the second packet within a period of time, a size of a jitter buffer, a size of a jitter buffer in a destination node, a size of a jitter buffer in a source node, a size of a list in a router, a size of a circular queue in the router, an acceptable delay based on the data signal, if the packet list is full, if a threshold in the packet list is met, and a fixed time.

4. The system of claim 1, wherein the at least one field in the first packet or the second packet is an item selected from the group comprising: a checksum, a cyclic-redundancy check code, a timestamp, a duration field, a sequence number, a header, the first payload, the second payload, an urgency field, a packet type, a quality of service field, a packet length, a source node number, and a destination node number.

5. The system of claim 1, wherein the packet processor is configured to determine that the second payload was generated from the same segment of the data signal as the first packet by determining that the first packet and the second packet are identical.

6. The system of claim 1, wherein the data signal is at least one item selected from the group comprising: an audio signal, a video signal, and a control signal.

7. The system of claim 1, wherein first packet uses a first protocol, and wherein the second packet uses a second protocol.

8. The system of claim 1, wherein the first payload is encoded with a first encoding technique, and wherein the second payload is encoded with a second encoding technique.

9. The system of claim 1, wherein the packet processor and the packet sender are configured to receive and send a plurality of packets generated from the same segment of the data signal as the first packet, in the same manner as described in claim 1.

10. A method for routing packets by a router, comprising:
a. receiving, by a processor, a first packet, wherein the first packet comprises a plurality of fields, including a first payload, and wherein the first payload is generated from a segment of a data signal;
b. determining, by the processor, that a second packet that was generated from the same segment of the data signal as the first packet was not received previously, by comparing information in a packet list to at least one field in the first packet;
c. responsive to step (b),
  (1) determining a first optimal route for the first packet,
  (2) sending the first packet on the first optimal route, and
  (3) storing information about the first packet in the packet list;
d. receiving, by the processor, the second packet, wherein the second packet comprises a plurality of fields, including a second payload, and wherein the second payload is generated from a segment of the data signal;
e. determining, by the processor, that the second payload was generated from the same segment of the data signal as the first packet, by comparing the stored information about the first packet in the packet list to at least one field in the second packet; and
f. responsive to step (e),
  (1) determining a second optimal route for the second packet,
  and
  (2) sending the second packet on the second optimal route.

11. The method of claim 10, responsive to step (e), deleting the information about the first packet from the packet list.

12. The method of claim 10, further comprising the step of: deleting the information about the first packet from the packet list based on at least one item selected from the group comprising: not receiving the second packet within a period of time, a size of a jitter buffer, a size of a jitter buffer in a destination node, a size of a jitter buffer in a source node, a size of a table in a router, a size of a circular queue in the router, an acceptable delay based on the data signal, if the packet list is full, if a threshold in the packet list is met, and a fixed time.

13. The method of claim 10, wherein the at least one field in the first or the second packet is an item selected from the group comprising: a checksum, a cyclic-redundancy check, a timestamp, a duration field, a sequence number, a header, the first payload, the second payload, an urgency field, a packet type, a quality of service field, a packet length, a source node number, and a destination node number.

14. The method of claim 10, wherein the step of determining that the second payload was generated from the same segment of the data signal as the first packet is accomplished by determining that the first packet and the second packet are identical.

15. The method of claim 10, wherein the data signal is at least one item selected from the group comprising: an audio signal, a video signal, and a control signal.

16. The method of claim 10, wherein first packet uses a first protocol, and wherein the second packet uses a second protocol.

17. The method of claim 10, wherein the first payload is encoded with a first encoding technique, and wherein the second payload is encoded with a second encoding technique.

18. The method of claim 10, further comprising: receiving and sending a plurality of packets that are generated from the same segment of the data signal as the first packet, using the same steps as described in claim 10.

19. An apparatus for routing packets comprising:
a. means for receiving a first packet, wherein the first packet comprises a plurality of fields, including a first payload, and wherein the first payload is generated from a segment of a data signal;

b. means for determining that a second packet that was generated from the same segment of the data signal as the first packet was not received previously, by comparing information in a packet list to at least one field in the first packet;
c. means responsive to a determination that the second packet was not received previously, for
   (1) determining a first optimal route for the first packet,
   (2) sending the first packet on the first optimal route, and
   (3) storing information about the first packet in the packet list;
d. means for receiving the second packet, wherein the second packet comprises a plurality of fields, including a second payload, and wherein the second payload is generated from a segment of the data signal;
e. means for determining that the second payload was generated from the same segment of the data signal as the first packet by comparing the stored information about the first packet in the packet list to at least one field in the second packet; and
f. means responsive to a determination that the second payload was generated from the same segment of the data signal as the first packet, for
   (1) determining a second optimal route for the second packet, and
   (2) sending the second packet on the second optimal route.

20. A system for routing packets comprising:
a. a packet processor configured to receive a first packet, wherein the first packet comprises a plurality of fields, including a first payload, and wherein the first payload is generated from a segment of a data signal, determine that a second packet that was generated from the same segment of the data signal as the first payload was not received previously by comparing information in a packet list to at least one field in the first packet, receive the second packet, wherein the second packet comprises a plurality of fields, including a second payload, and wherein the second payload is generated from a segment of the data signal, determine that the second payload was generated from the same segment of the data signal as the first payload by comparing information about the first packet stored in the packet list to the at least one field in the second packet, determine if the information about the first packet in the packet list needs to deleted, and delete the information about the first packet from the packet list in response to determining that the information needs to be deleted;
b. a packet sender responsive to determining that a second packet that was generated from the same segment of the data signal as the first packet was not received previously by comparing information in a packet list to at least one field in the first packet, by
   (1) storing information about the first packet in the packet list,
   (2) determining a first optimal route for the first packet,
   (3) sending the first packet on the first optimal route; and
c. responsive to determining that the second payload was generated from the same segment of the data signal as the first packet by comparing information about the first packet stored in the packet list to the at least one field in the second packet, by
   (1) determining a second optimal route for the second packet,
   (2) sending the second packet on the second optimal route, and
   (3) deleting the information about the first packet from the packet list.

21. A method for routing packets by a router, comprising:
a. receiving, by a processor, a first packet, wherein the first packet comprises a plurality of fields, including a first payload, and wherein the first payload is generated from a segment of a data signal;
b. determining, by the processor, that a second packet that was generated from the same segment of the data signal as the first payload was not received previously by comparing information in a packet list to at least one field in the first packet;
c. responsive to step (b),
   (1) storing information about the first packet in the packet list,
   (2) determining a first optimal route for the first packet, and
   (3) sending the first packet on the first optimal route;
d. receiving, by the processor, the second packet, wherein the second packet comprises a plurality of fields, including a second payload, and wherein the second payload is generated from a segment of the data signal;
e. determining, by the processor, that the second payload was generated from the same segment of the data signal as the first payload by comparing the stored information about the first packet in the packet list to at least one field in the second packet;
f. responsive to step (e),
   (1) determining a second optimal route for the second packet,
   (2) sending the second packet on the second optimal route, and
   (3) deleting the information about the first packet from the packet list;
g. waiting for a period of time to determine if the information about the first packet in the packet list needs to deleted; and
h. responsive to determining that the information about the first packet in the packet list needs to be deleted, deleting the information about the first packet from the packet list.

* * * * *